United States Patent
Wang et al.

(10) Patent No.: US 9,562,646 B2
(45) Date of Patent: Feb. 7, 2017

(54) HYDROGEN STORAGE CONTAINER

(71) Applicant: UT-Battelle, LLC, Oak Ridge, TN (US)

(72) Inventors: Jy-An John Wang, Oak Ridge, TN (US); Zhili Feng, Knoxville, TN (US); Wei Zhang, Dublin, OH (US)

(73) Assignee: UT-Battelle, LLC, Oak Ridge, TN (US)

( * ) Notice: Subject to any disclaimer, the term of this patent is extended or adjusted under 35 U.S.C. 154(b) by 269 days.

(21) Appl. No.: 13/940,567

(22) Filed: Jul. 12, 2013

(65) Prior Publication Data

US 2015/0014186 A1    Jan. 15, 2015

(51) Int. Cl.
*F17C 1/00* (2006.01)
*F17C 1/02* (2006.01)

(52) U.S. Cl.
CPC ............ *F17C 1/00* (2013.01); *F17C 1/007* (2013.01); *F17C 1/02* (2013.01); *F17C 2201/0104* (2013.01); *F17C 2201/032* (2013.01); *F17C 2201/054* (2013.01); *F17C 2201/056* (2013.01); *F17C 2203/0604* (2013.01); *F17C 2203/0617* (2013.01); *F17C 2203/0619* (2013.01); *F17C 2203/0621* (2013.01); *F17C 2203/0624* (2013.01); *F17C 2203/0639* (2013.01); *F17C 2203/0643* (2013.01); *F17C 2203/0678* (2013.01); *F17C 2203/0695* (2013.01); *F17C 2205/0111* (2013.01); *F17C 2205/0142* (2013.01); *F17C 2205/0146* (2013.01); *F17C 2221/012* (2013.01); *F17C 2223/0123* (2013.01); *F17C 2223/036* (2013.01); *F17C 2250/043* (2013.01); *F17C 2250/0439* (2013.01); *F17C 2250/0452* (2013.01); *F17C 2250/0491* (2013.01); *F17C 2270/0139* (2013.01); *F17C 2270/0581* (2013.01); *Y02E 60/321* (2013.01)

(58) Field of Classification Search
CPC ............... F17C 1/00; F17C 2201/032; F17C 2201/0104; F17C 2203/0604; F17C 2203/0617; F17C 2203/0619; F17C 2203/0621; F17C 2203/0624; F17C 2203/0639; F17C 2203/0643; F17C 2203/0678; F17C 2203/0695; F17C 2205/0111; F17C 2205/0142; F17C 2205/0146; F17C 2223/0123; F17C 2223/036; F17C 2250/043; F17C 2250/0439; F17C 2250/0452; F17C 2250/0491
USPC .................. 141/129, 130, 131, 230, 94, 95
See application file for complete search history.

(56) References Cited

U.S. PATENT DOCUMENTS 3,224,619 A * 12/1965 Maurin et al. ............... 220/587
3,390,211 A *  6/1968 Ziegler .......................... 264/32

(Continued)

FOREIGN PATENT DOCUMENTS

GB        1201117 A    8/1970
GB        1263569 A    2/1972

*Primary Examiner* — Timothy L Maust
*Assistant Examiner* — Andrew Schmid
(74) *Attorney, Agent, or Firm* — Warner Norcross & Judd LLP

(57) ABSTRACT

An apparatus and system is described for storing high-pressure fluids such as hydrogen. An inner tank and pre-stressed concrete pressure vessel share the structural and/or pressure load on the inner tank. The system and apparatus provide a high performance and low cost container while mitigating hydrogen embrittlement of the metal tank. System is useful for distributing hydrogen to a power grid or to a vehicle refueling station.

14 Claims, 5 Drawing Sheets

(56) References Cited

U.S. PATENT DOCUMENTS

| | | | | |
|---|---|---|---|---|
| 3,404,497 A * | 10/1968 | Burrow | | 52/223.2 |
| 3,540,176 A * | 11/1970 | Hosegood et al. | | 52/223.2 |
| 3,633,328 A * | 1/1972 | Closner et al. | | 52/223.2 |
| 3,801,444 A * | 4/1974 | Kraemer | | 376/295 |
| 3,863,408 A * | 2/1975 | Closner et al. | | 52/223.2 |
| 4,041,722 A * | 8/1977 | Terlesky et al. | | 62/45.1 |
| 4,045,285 A * | 8/1977 | Baumgaertner et al. | | 376/323 |
| 4,069,642 A * | 1/1978 | Hendriks | | 52/223.2 |
| 4,313,902 A * | 2/1982 | Lin et al. | | 264/228 |
| 4,349,991 A * | 9/1982 | Schwiers et al. | | 52/21 |
| 4,389,825 A * | 6/1983 | Chow | | 52/223.2 |
| 4,463,872 A * | 8/1984 | Yellowlees | | 220/592 |
| 4,479,336 A * | 10/1984 | Schoening et al. | | 52/223.2 |
| 4,645,641 A * | 2/1987 | Nicolai et al. | | 376/283 |
| 4,661,313 A * | 4/1987 | Schoening | | G21C 13/093 376/295 |
| 4,702,052 A * | 10/1987 | Chow | | 52/223.2 |
| 5,110,006 A * | 5/1992 | Becker et al. | | 220/592.26 |
| 5,544,210 A * | 8/1996 | Wedellsborg | | 376/294 |
| 6,418,962 B1 * | 7/2002 | Wozniak | | B60K 15/013 137/266 |
| 2008/0149643 A1* | 6/2008 | Schelling et al. | | 220/567.1 |
| 2008/0302804 A1* | 12/2008 | Simmons et al. | | 220/560.05 |
| 2008/0307798 A1* | 12/2008 | Luo et al. | | 62/49.1 |
| 2010/0011663 A1* | 1/2010 | Coyle | | 48/127.3 |
| 2011/0100583 A1* | 5/2011 | Freund et al. | | 165/10 |
| 2011/0168722 A1* | 7/2011 | Baudat et al. | | 220/560.12 |
| 2011/0315690 A1* | 12/2011 | Weisberg | | 220/560.02 |
| 2012/0048865 A1* | 3/2012 | Eihusen et al. | | 220/586 |
| 2012/0217251 A1* | 8/2012 | Handa | | 220/562 |
| 2013/0087567 A1* | 4/2013 | Kaneko et al. | | 220/590 |
| 2013/0186904 A1* | 7/2013 | Tessier et al. | | 220/581 |
| 2013/0336721 A1* | 12/2013 | McBride et al. | | 405/55 |
| 2014/0166670 A1* | 6/2014 | Sirosh | | 220/581 |
| 2015/0014186 A1* | 1/2015 | Wang et al. | | 206/6 |
| 2015/0136789 A1* | 5/2015 | Nettis et al. | | 220/560.04 |

\* cited by examiner

HYDROGEN STORAGE CONTAINER

This invention was made with government support under Contract No. DE-AC05-00OR22725 awarded by the U.S. Department of Energy. The government has certain rights in the invention.

BACKGROUND OF THE INVENTION

The present invention relates to a stationary hydrogen storage container.

Efforts to reduce carbon emissions as a byproduct of energy use have increased in recent years. The environmental benefits of alternatives to hydrocarbon and fossil fuel energy sources are frequently studied. One of these alternatives is known as fuel cell technology. Generally, fuel cell technology utilizes hydrogen as a fuel source and produces innocuous by-products such as water. A typical power generation process involves a proton exchange membrane ("PEM") that combines hydrogen with oxygen from air under controlled pressure. Inside the fuel cell, hydrogen fuel on the anode side with the oxidant on the cathode side results in the production of electricity.

To promote use of fuel cell technology compressed hydrogen gas can be generated as needed which requires negligible storage space. Alternatively, hydrogen is stored for later use and may be distributed to other locations. For purposes of hydrogen storage, some tanks have been made of steel, aluminum, and thermoplastics and the tanks are sometimes wrapped with filament windings of carbon or glass fibers depending upon the maximum pressure under which the hydrogen is to be stored. However, as the fuel cell infrastructure has developed, these tanks have not provided the high capacity and low cost required for the common and regular use of hydrogen while consistently meeting pressure requirements. In particular, some structural metals, notably high-strength steels, become embrittled thus resulting in severely reduced fracture toughness following exposure to hydrogen. This process, known as hydrogen embrittlement, can take place as a result of the unintentional introduction of hydrogen into metals during the manufacturing processes (e.g., forming, finishing and welding) or the long-term exposure to compressed gaseous hydrogen ($CGH_2$).

There remains a need for a hydrogen fueling infrastructure including, as a main part, a hydrogen storage component. The storage component is needed to be capable of housing bulk hydrogen in a low cost and reliable manner. Also there is a need for available stored hydrogen fuel to be available for applications such as refueling of vehicles and for utility load leveling using fuel cells.

SUMMARY OF THE INVENTION

The present invention provides a storage container for a high-pressure fluid such as compressed gaseous hydrogen wherein an inner tank or vessel is at least partially surrounded by a concrete storage vessel adapted to share a pressure load on the inner tank.

In one embodiment, an apparatus for bulk storage of a high-pressure fluid includes a tank for holding the high-pressure fluid and a pre-stressed concrete pressure vessel ("PCPV") disposed at least partially around the tank. The PCPV is adapted to provide at least a portion of structural support for said tank. In this embodiment, there may be included one or more steel tendons within the pre-stressed concrete pressure vessel. There may be multiple layers of tendons depending upon the design pressure capacity carried by the PCPV. There may further be provided a plurality of tanks fluidly coupled to one another with a manifold which is also fluidly coupled to a charging/discharging tank. The inner tank may be made of a steel material and may have a plurality of layers wherein the innermost layer is resistant to hydrogen embrittlement. The gas permeated through the inner-most layer is then vented from the tank.

Further, the apparatus may include providing a pre-stressed concrete vessel and inner tank that share support of a pressure load on the tank. An interface material may be disposed between the inner tank and the pre-stressed concrete vessel that is concrete with high strength and high ductile properties. Such an apparatus may be specifically suited to contain hydrogen.

In one embodiment, the storage container for a high pressure fluid includes a storage tank for holding the high-pressure fluid and a PCPV disposed around said tank, the PCPV adapted to provide at least a portion of a pressure load to said tank. A charge/discharge tank is fluidly coupled to the storage tank wherein the storage tank has multiple layers.

In one embodiment, one or more sensors may be positioned within the container and the sensors adapted to monitor one or more characteristic of the container such as temperature, pressure or fluid detection.

Another embodiment provides a hydrogen charging/discharging system including a storage container for the hydrogen that is a composite vessel including an inner tank adapted to contain the hydrogen and a PCPV disposed at least partially around the inner tank. The PCPV and inner tank share support of a pressure load on the tank. The system includes a distribution unit adapted to direct the hydrogen into and out of the inner tank.

In one embodiment, the system includes an inlet and an outlet for the hydrogen in communication with the distribution unit and the inlet is adapted to receive the hydrogen from a hydrogen generator while the outlet is adapted to provide the hydrogen to a power distribution grid.

In one embodiment, the system includes an inlet and an outlet for the hydrogen in communication with said distribution unit and the inlet is adapted to receive the hydrogen from a hydrogen transporter while the outlet is adapted to provide the hydrogen to a vehicle fueling station.

The current invention provides a composite vessel that is a low-cost off-board bulk stationary storage of hydrogen for use in a hydrogen infrastructure.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of

DESCRIPTION OF THE CURRENT EMBODIMENT

Figure 1:
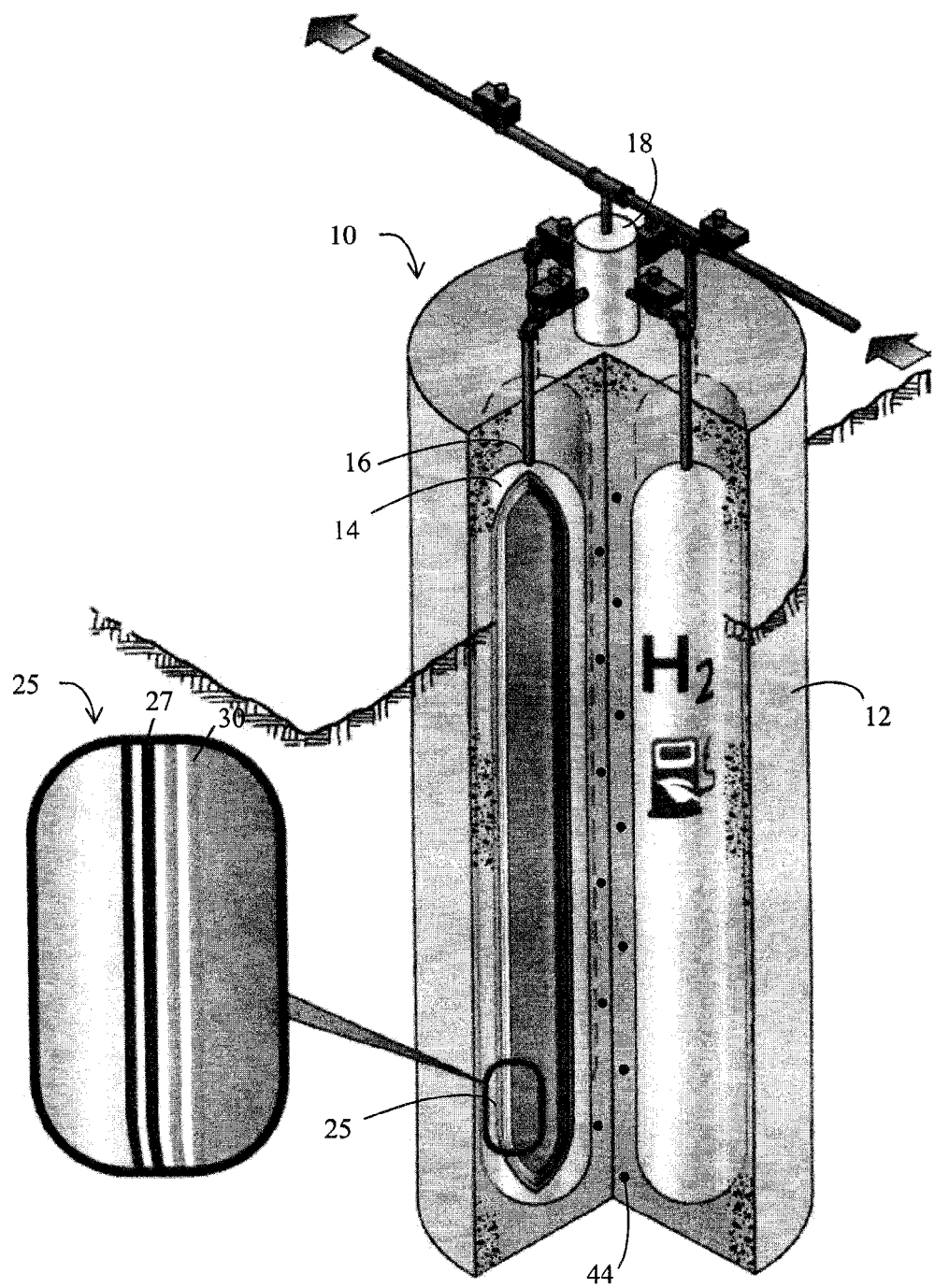
FIG. 1 is a schematic depiction of a container according to an embodiment of the present invention.
Figure 2:
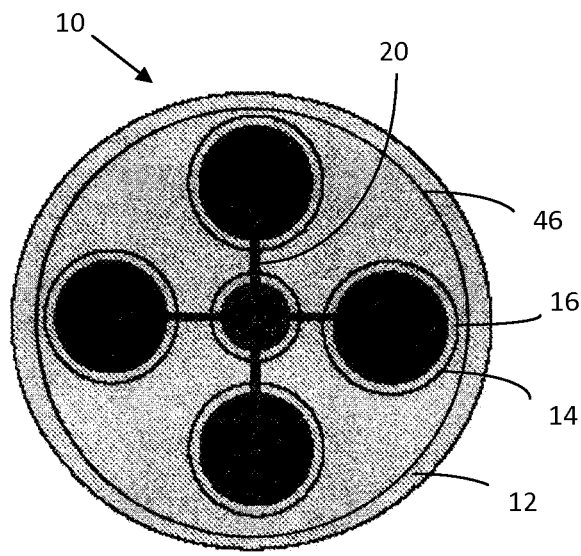
FIG. 2 is a top view of the container.
Figure 3:
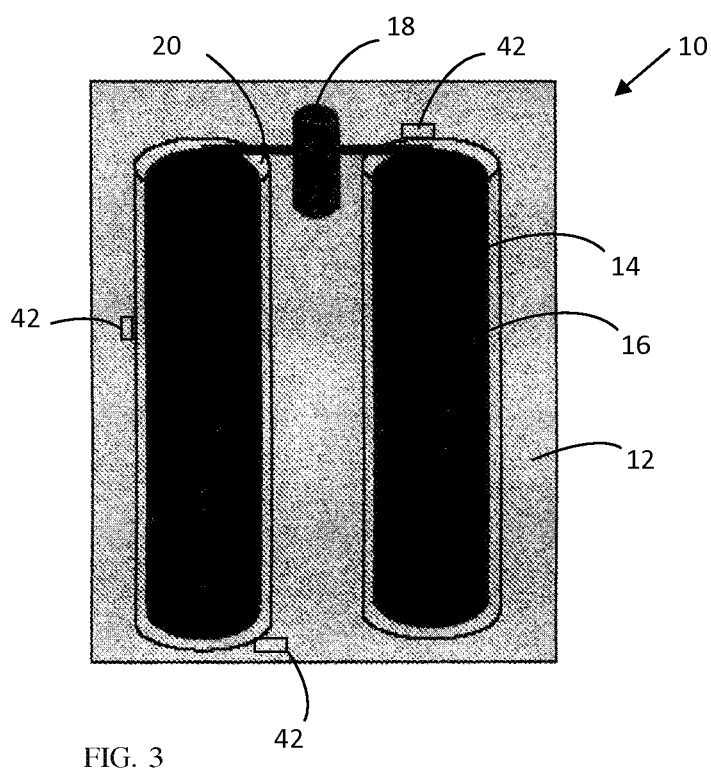
FIG. 3 is an elevation view of a container.

A hydrogen storage container in accordance with an embodiment of the invention is shown in FIGS. 1-3 and is generally designated 10. The container 10 of this embodiment is designed to store and dispense compressed gaseous hydrogen ("CGH$_2$") and generally includes a concrete structure such as a pre-stressed concrete pressure vessel ("PCPV") 12, at least one tank 14 in a chamber 16 within the PCPV 12. The tank 14 may be in communication with a charge/discharge tank 18 through a conduit 20 that may be part of a manifold. As best shown in FIG. 2, the chambers 16 and tanks 14 may be arranged in the PCPV 12 in a honeycomb fashion for example. As shown in the figures, four, equally-spaced tanks are included; however, in other examples, more or fewer tanks 14 may be used.

One or more sensors 42 may be located at various positions within and/or around the container 10, PCPV 12 and/or tank 14. Additionally, within the PCPV 12, there may be tendons 44, 46 located near an outer boundary of the overall composite container or vessel 10, or around the chamber 16 provided for an individual tank 14.

Each single tank 14 may be part of a single composite vessel and then may be inserted into an outer concrete structure to serve as a housing. Alternatively, the outer concrete structure may share the pressure capacity of the container 10 as described in more detail herein.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Pre-stressing of the concrete may be accomplished by pre-tensioning, or by bonded or unbonded post-tensioning. As discussed in greater detail herein, the concrete may be designed to provide strength sufficient to off-set the pressure provided to the chamber 16 walls by the tank 14.

The tank 14 may be metal such as, but not limited to, stainless steel or carbon steel. Rather than merely storing the gas, the metal may be configured to provide a portion of support for the structural load of the container 10. The tank 14 is preferably constructed to maintain up to 50% of the cylinder stress or hoop load stress of the container 10. In order to facilitate this function of the tank 14, a large aspect ratio of length over diameter of the tank can be provided. For the same wall thickness, longer and slimmer tanks 14 are generally capable of providing greater structural support to the container 10. Additionally, the tank 14 may be constructed of multiple layers with the stored gas, such as hydrogen, being allowed to permeate through one or more inner layers and then vented to mitigate the intensity of hydrogen embrittlement to the tank 14. The venting processes may be facilitated by providing a system of vent holes (not shown) through one or more different layers and/or providing small grooves on the layer surface. The embodiment shown in FIG. 1 includes a tank 14 with a multi-layered wall 25. Tanks 14 of this type generally share a common geometry and are substantially axially aligned. The different layers 27 of a multi-layered tank are generally slightly off-set in size to allow for a nesting of one layer within another. Each of the individual layers 27 of a multiple layer tank may be constructed of the same or different materials. For example, the inner layer 30 of a tank 14 with multiple layers may be stainless steel of about ¼ inch or less. Typically, each layer 27 of a multiple layer tank 14 is about 1 inch or less in thickness. Alternatively, the inner layer 30 may be constructed of an oxide material to act as a barrier to further reduce hydrogen permeability. The remaining layers may be carbon steel or high strength steel, if desired. In some examples, up to four layers are used (FIG. 1), in other examples up to six layers are used, and, in yet other examples, up to eight layers are used.

Conventionally, the pressure balance or imbalance may present a challenge when transferring hydrogen from one enclosure to another. In some container designs, the linkages between a main chamber and other chambers are troublesome for maintaining optimum pressure. It also may be difficult to purge the container of gas. With the illustrated embodiments, one or more of these issues can be minimized. The tank 14 in each chamber 16 serves as an independent unit and is, in the embodiment, linked only to the conduit 20 to the charge/discharge tank 18. FIG. 3 includes an alternate embodiment to FIG. 1 in that the charge/discharge tank 18 is positioned within the PCPV 12 rather than outside and/or above the PCPV 12.

The container 10 may be considered a composite vessel. The sharing of the structural load between the tank 14 and the PCPV 12 allows the tank 14 to be constructed with walls of a reduced thickness as compared to conventional hydrogen storage tanks. One advantage of a thinner walled tank 14 is that the tank 14 may be fabricated at a lower cost. An example of the amount of reduction in thickness of the tank 14 is illustrated below by the data represented in Tables 1 and 2 for a storage tank with the target storage volume of 1,000 cubic feet (ft$^3$).

For this example, it may be assumed that four (4) tanks 14 will be used with each tank 14 having 250 ft$^3$ and 10,000 psi internal pressure. Three scenarios involving varying lengths and radii as follows:

Scenario 1 includes a 10-foot long tank with a radius of 2.8 feet.

Scenario 2 includes a 15-foot long tank with a radius of 2.3 feet.

Scenario 3 includes a 20-foot long tank with a radius of 2.0 feet.

The conventional steel thickness requirements for tanks with these configurations may be calculated by the following equation: Thickness=Pressure×(radius/allowable stress). For example, if the allowable (design) stress for a tank under Scenario 1 is 30 Ksi, the thickness may be calculated as equal to 10,000 psi×(2.8 feet÷30,000 psi) which equals 0.9333 feet or 11.2 inches. The thickness requirements for scenario 1, 2, and 3 are listed in Table 1.

TABLE 1

Conventional Steel Pressure Thickness Requirements for 10,000 psi Pressure

| Scenario | Thickness (inches) of Steel Tanks (Three Different Allowable Stress for Design) | | |
|---|---|---|---|
|  | 30 Ksi | 50 Ksi | 70 Ksi |
| 1 | 11.2 | 6.7 | 4.8 |
| 2 | 9.2 | 5.5 | 3.9 |
| 3 | 8.0 | 4.8 | 3.4 |

By integrating the PCPV 12 and tank 14, the thickness requirements of the tank 14 listed in Table 1 can be significantly reduced. For example, for 50 ksi allowable design stress, the portion of the internal pressure of the tank 14 can be balanced by the external PCPV 12, i.e., the reduction of the effective pressure carried by the steel container, the estimated thicknesses of the inner hydrogen container are shown in Table 2.

When faced with a choice between (1) use of a hydrogen tank with a thickness prescribed by conventional methods and a conventional concrete design for the confinement, or (2) use of a hydrogen tank with a thickness sized according to the invention described herein with a concrete design strength as described herein, a designer may find it useful to conduct a cost/benefit analysis comparing options (1) and (2), above. Generally, a hydrogen storage and confinement solution that includes high-performance PCPV structure design, which has characteristic flexible forms for construction, is more economic than metallic pressure vessel manufacturing. Therefore, the combination of the thinner walled tank 14 and PCPV 12 of appropriate strength may, in some applications, provide a more desirable container 10 construction from an economical standpoint.

TABLE 2

Revised Steel Pressure Thickness Requirements for an integrated container-confinement design, with 10,000 psi internal pressure, for 50 ksi allowable steel stress

| Scenario | Thickness (inches) of Steel Tanks (Effective Pressure for Steel Container Design) | | | |
|---|---|---|---|---|
|  | 10,000 psi | 7,000 psi | 5,000 psi | 3,000 psi |
| 1 | 6.7 | 4.7 | 3.4 | 2.0 |
| 2 | 5.5 | 3.9 | 2.8 | 1.7 |
| 3 | 4.8 | 3.4 | 2.4 | 1.5 |

Comparing Tables 1 and 2 for Scenario 1, the steel thickness can be significantly reduced from 6.7 to 3.4 inches as the effective pressure carried by the steel tank is decreased from 10,000 psi to 5,000 psi. Therefore, the concrete strength may be at least greater than the reduced pressure (pressure that was not carried by the tank 14). For example, to carry a pressure of 5000 psi, the concrete of PCPV can have strength greater than 5000 psi; and the tension loading in the PCPV will be carried by the steel tendon and other steel reinforcement bars. The tendons 44 shown in FIG. 1 are embedded in the PCPV 12 and generally wrap around the individual tanks 14. The tendons 44, 46 may be applied within the container 10 by a variety of methods. For example, in a single composite tank, the tendons 44, 46 may be pre-stressed by a manufacturer while the concrete is cast around the inner tank 14. If the container 10 is built on-site, after the inner tank 14 is installed inside the outer PCPV 12 stress may be applied by the tendons embedded in the PCPV 12. The tendons 44 may be individual circular members embedded in the PCPV 12 at differing depths or may be one or more tendons wrapping around the tank 14 in a substantially helical manner. Alternatively, the tendons 46 of FIG. 2 are embedded in the PCPV 12 and encircle multiple tanks.

Figure 4:
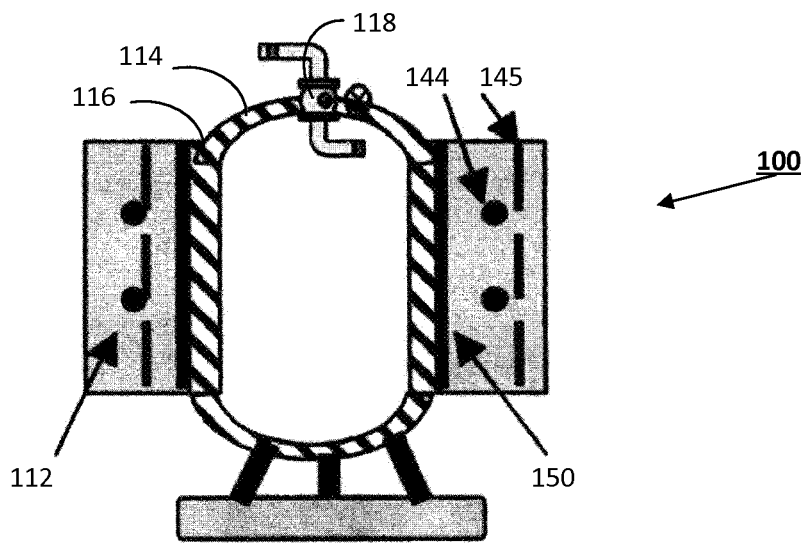
FIG. 4 is a schematic representation of a container.
Figure 5:
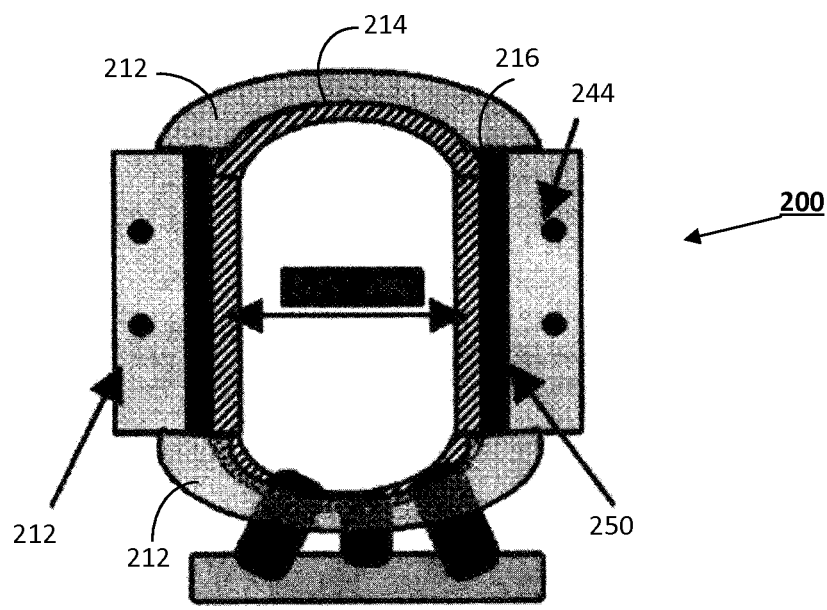
FIG. 5 is a schematic representation of a container.

Referring now to FIGS. 4 and 5, the composite vessel/container 100, 200 may have varying specific arrangements for the inner tank 114, 214 and PCPV portion 112, 212 of the container 100, 200. One option is depicted in FIG. 4 where the outer concrete structure 112 provides circumferential reinforcement to the inner tank 114 and charge/discharge tank 118. The embodiment of FIG. 4 also includes tendons 145 oriented parallel to the longitudinal axis of the inner tank 114 in addition to tendons 144 that are embedded in the PCPV 112 and at least partially surround the inner tank 114. The maximum pressure load carrying capacity of the inner tank 114 may be about 50%, and the PCPV 112 carries the balance of the pressure loading. Another option is shown in FIG. 5 where the outer PCPV 212 may include tendons 244 and provides both axial and circumferential reinforcements to the inner tank 214 where a pressure load carrying capacity of the outer PCPV 212 may be greater than 50% and up to 70% or more. Additional design parameters for the concrete vessel 12 to provide confinement as an outer pressure vessel may be considered if desired. For example, additional concrete thickness or strength requirements may apply in the event the PCPV 12, 112, 212 is intended to provide containment. Such additional parameters may be based on the overall effective cost including the concerns on manufacturing, construction, integrity and safety, and the long term storage surveillance.

While the strength of the container 100, 200 may be shared by the PCPV 112, 212 and tank 114, 214 for the purpose of withstanding design pressures, an additional interface material 150, 250 may be included in the container 100, 200 as shown in FIGS. 4 and 5. The interface material 150, 250 may be a high performance concrete having a high strength and ductility. The interface material 150, 250 is particularly useful when the container 100, 200 is constructed in two phases. For example, the tanks 114, 214 may be fabricated separately such as at a plant and transferred to a construction site where the PCPV 112, 212 was constructed. A two-phase construction would require the tanks to be set or installed within the chambers 116, 216 of the PCPV 112, 212. The process of installing the tank 114, 214 in the PCPV 112, 212 may be facilitated by a more ductile layer of interface material.

In the 1950s, Portland Concrete Association (PCA) considered 5000 psi (34 MPa) to be high strength concrete. By 1990, two high-rise buildings were constructed in Seattle using concrete with strengths of up to 19,000 psi (131 MPa). Ultra-high-strength concrete is now manufactured with strengths in excess of 21,750 psi (150 MPa). Therefore, the integration of the tank 14 and pre-stress concrete pressure vessel 12 for developing a safe and economic hydrogen storage protocol is feasible. The container 10, can utilize cost-effective commodity materials (structural steels and concretes) and high-productivity and low-cost fabrication technologies.

According to the embodiment illustrated in FIG. 3, the container 10 may have positioned therein one or more sensors 42 embedded in the concrete vessel 12 near the interface between the tank 14 and the PCPV 12 with one or more sensors 42 positioned at varying locations along the length/depth and/or width of the PCPV 12. Rather than being embedded in the PCPV 12, the sensors 42 may, alternatively or additionally, be located on the surface of the tank 14 and/or at or near the interface between the PCPV 12 and the tank 14. Each sensor 42 may communicate and/or store data, such as pressure and/or temperature levels or monitor for material leaks from the tank 14. The sensors may also provide real time information by wired or wireless communication to a receiver (not shown) for recordation or may initiate an alarm or send an alert, as desired. Alternatively, the sensors 42 can be embedded in the inner tank 14 and/or installed on the inner surface of the inner tank 14.

Figure 6:
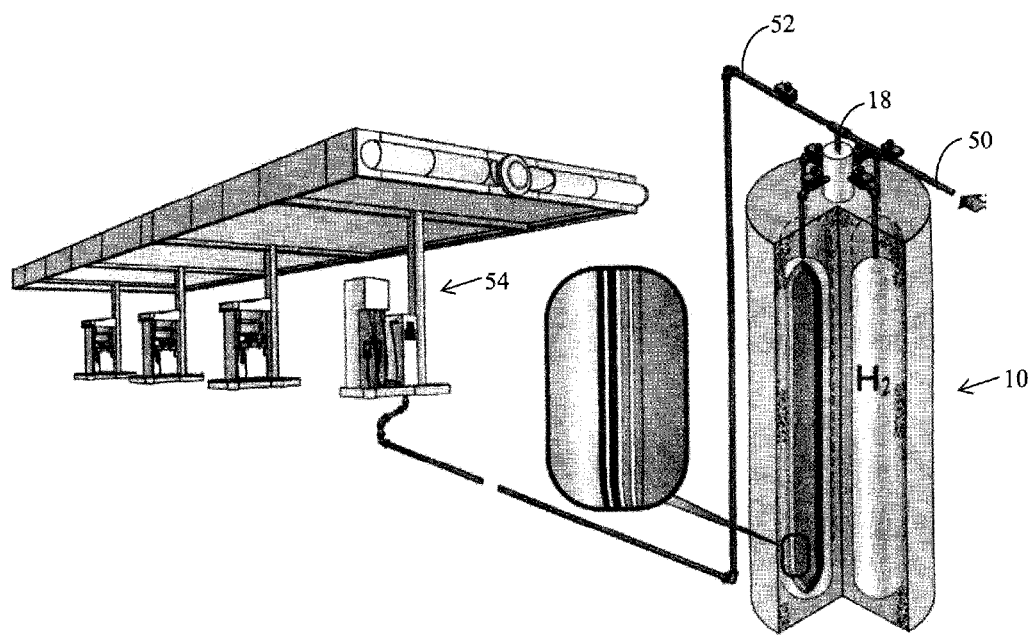
FIG. 6 is a schematic of a refueling station incorporating a container according to an embodiment of the present invention.
Figure 7:
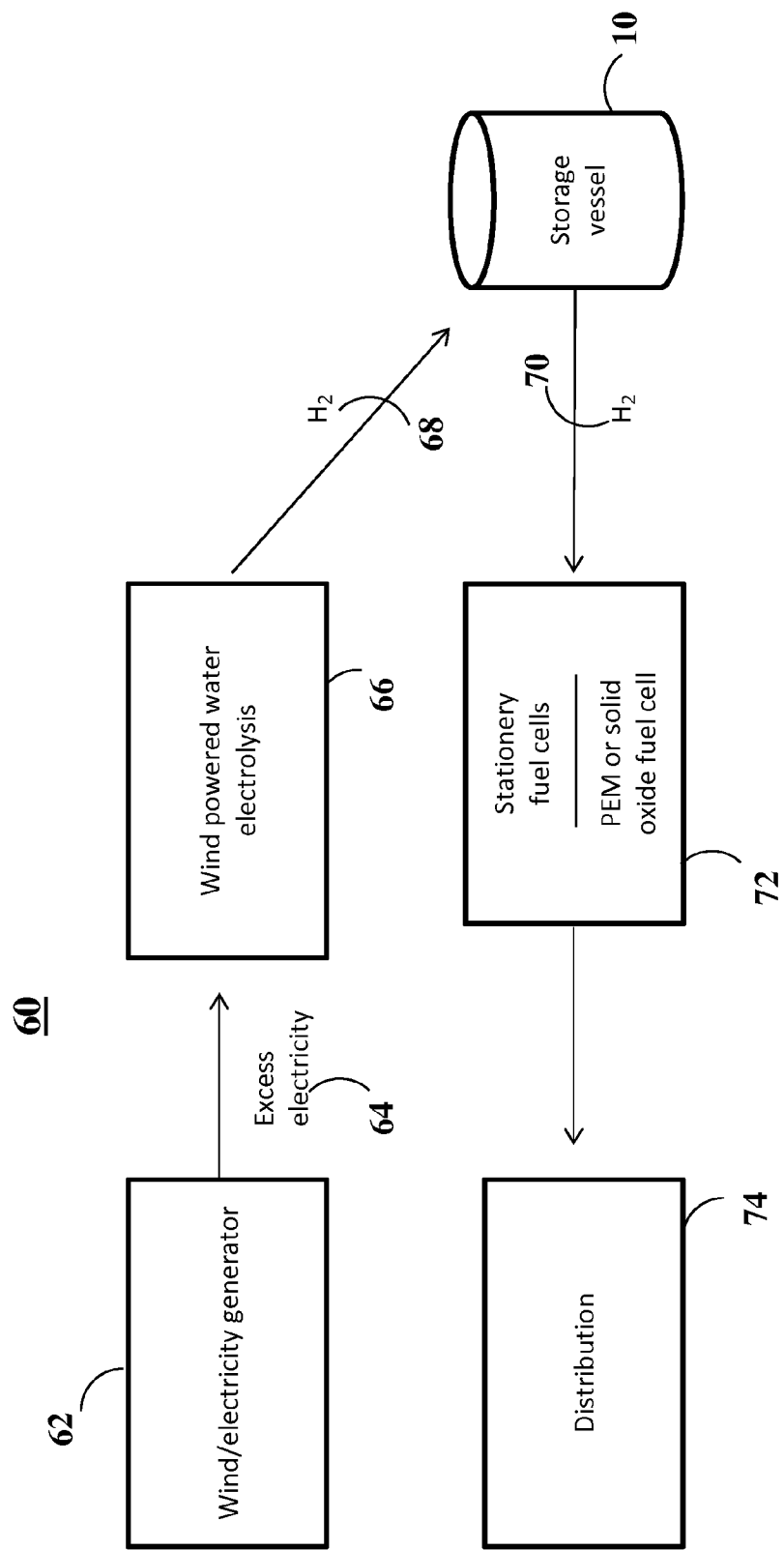
FIG. 7 is a flow diagram of a utility load leveling process incorporating a container according to an embodiment of the invention.

Referring now to FIGS. 6-7, the container 10 may be part of a hydrogen charging/discharging system used in refueling stations for fuel cell powered vehicles; or in fuel cell power generation systems for utility scale load leveling and peak sharing applications. Aside from the container 10, such a system may include a distribution unit, for example the charge/discharge tank 18, in communication with a tank inlet 50 and, if desired, a separate tank outlet 52. For example as shown in FIG. 6, a hydrogen fuel cell powered vehicle (not shown) may recharge its hydrogen levels at a refueling station 54, that incorporates a storage container 10 as described herein.

A system including use of the container 10 for hydrogen storage in a utility load level system 60 is shown in FIG. 7. A power utility may generate energy 62, by several known processes including wind generation such as from a wind farm, in excess of the amount needed to supply power to current users. In the case of a utility producing excess wind generated power, the excess electricity 64 may be sent to a wind powered water electrolysis system 66 that produces hydrogen 68 and transfers the hydrogen 68 to a container 10 of the type described herein. During a time of peak use, the hydrogen 70 can be drawn from the container 10 for use in a stationary fuel cell 72, such as a proton exchange membrane or solid oxide fuel cell to produce electricity for the power distribution grid 74.

Although described in connection with power utility storage and refueling stations, the present invention may be used in essentially any application where hydrogen storage is desired.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An apparatus for bulk storage of high-pressure hydrogen gas comprising:
a plurality of multi-layered tanks adapted to hold the high-pressure hydrogen gas for selective discharge through a distribution unit, each of the plurality of multi-layered tanks including an inner layer and an outer layer each being a metal material, wherein said inner layer is nested within said outer layer, and wherein said inner layer is resistant to hydrogen embrittlement and permits the transfer of hydrogen gas therethrough for venting from said multi-layered tank;
a pre-stressed concrete pressure vessel disposed around said plurality of multi-layered tanks and entirely enclosing said plurality of multi-layered tanks except through said distribution unit, said pre-stressed concrete pressure vessel adapted to provide at least a portion of structural support for said plurality of multi-layered tanks,
wherein the high-pressure hydrogen gas exerts a cylinder stress on each of said plurality of multi-layered tanks, each of said plurality of multi-layered tanks being adapted to carry a first portion of the cylinder stress and said pre-stressed concrete pressure vessel being adapted to carry a second portion of the cylinder stress, wherein, for each of said plurality of multi-layered tanks, the first portion of the cylinder stress as carried by said multi-layered tank is a substantial portion of the cylinder stress including up to 50% of the cylinder stress, and wherein the second portion of the cylinder stress as carried by said pre-stressed concrete pressure vessel is a substantial portion of the cylinder stress including at least 50% of the cylinder stress.

2. The apparatus as recited in claim 1 further comprising one or more steel tendons within said pre-stressed concrete pressure vessel.

3. The apparatus as recited in claim 1 further comprising a manifold which is also fluidly coupled to said distribution unit.

4. The apparatus as recited in claim 1 wherein said inner and outer layers of said plurality of multi-layered tanks are made of a steel material.

5. The apparatus of claim 4 further comprising an interface material disposed between an outermost layer of each of said plurality of multi-layered tanks and said pre-stressed concrete vessel.

6. The apparatus of claim 5 wherein said interface material is concrete with high strength and high ductile properties.

7. A composite storage container for pressurized hydrogen gas, comprising:
a plurality of multi-layered storage tanks for holding the pressurized hydrogen gas;
a pre-stressed concrete pressure vessel disposed around said plurality of multi-layered storage tanks, said pre-stressed concrete pressure vessel adapted to support at least a portion of a pressure load to said plurality of multi-layered storage tanks, wherein the pressurized hydrogen gas exerts a cylinder stress, each of said plurality of multi-layered storage tanks being adapted to carry a first portion of the cylinder stress and said pre-stressed concrete pressure vessel being adapted to carry a second portion of the cylinder stress, wherein, for each of said plurality of multi-layered tanks, the first portion of the cylinder stress as carried by said multi-layered storage tank is a substantial portion of the cylinder stress including up to 50% of the cylinder stress, and wherein the second portion of the cylinder stress as carried by said pre-stressed concrete pressure vessel is a substantial portion of the cylinder stress including at least 50% of the cylinder stress; and a charge/discharge tank fluidly coupled to said plurality of multi-layered storage tanks;

wherein each of said plurality of multi-layered storage tanks has multiple layers including an inner layer and an outer layer each being a metal material, wherein said inner layer is nested within said outer layer, wherein said inner layer is resistant to hydrogen embrittlement and permits the transfer of hydrogen gas therethrough for venting from said plurality of multi-layered storage tanks, and wherein said pre-stressed concrete pressure vessel entirely encloses said plurality of multi-layered tanks except through said charge/discharge tank.

8. The container of claim 7 further comprising one or more sensors within the container adapted to monitor one or more characteristic of the container.

9. The container of claim 8 wherein said monitored characteristic is at least one of temperature, pressure or fluid detection.

10. A hydrogen charging/discharging system comprising:
a storage container for high-pressure hydrogen gas comprising:
a plurality of multi-layered tanks adapted to contain the hydrogen gas, each of said plurality of multi-layered tanks including an innermost layer nested within an outer layer each being a metal material, wherein said inner layer is adapted to permit the transfer of hydrogen gas therethrough for venting from each of said plurality of multi-layered tanks;
a pre-stressed concrete pressure vessel disposed around each of said plurality of multi-layered tanks, wherein said pre-stressed concrete pressure vessel and said plurality of multi-layered tanks share support of a pressure load on said tank, wherein, for each of said plurality of multi-layered tanks, said multi-layered tank carries a first portion of the pressure load and said pre-stressed concrete pressure vessel carries a second portion of the pressure load, wherein the first portion of the pressure load as carried by said multi-layered tank is a substantial portion of the pressure load including up to 50% of the pressure load, and wherein the second portion of the pressure load as carried by said pre-stressed concrete pressure vessel is a substantial portion of the pressure load including at least 50% of the pressure load; and
a distribution unit adapted to direct the hydrogen gas into and out of said plurality of multi-layered tanks, wherein said pre-stressed concrete pressure vessel surrounds said plurality of multi-layered tanks and wherein the hydrogen gas is released through said distribution unit.

11. The system of claim 10 wherein said distribution unit includes an inlet and an outlet to each of said plurality of multi-layered tanks.

12. The system of claim 11 further comprising an interface material disposed between an outermost layer of each of said plurality of multi-layered tanks and said pre-stressed concrete vessel wherein said interface material is concrete with high strength and high ductile properties.

13. The system of claim 10 wherein said storage container further comprises an inlet and an outlet for the hydrogen in communication with said distribution unit; and
wherein said inlet is adapted to receive the hydrogen from a hydrogen generator and said outlet is adapted to provide the hydrogen to a power distribution grid.

14. The system of claim 10 wherein said storage container further comprises an inlet and an outlet for the hydrogen in communication with said distribution unit; and
wherein said inlet is adapted to receive the hydrogen from a hydrogen transporter and said outlet is adapted to provide the hydrogen to a vehicle fueling station.

* * * * *